(12) United States Patent
Vaughan et al.

(10) Patent No.: US 6,812,184 B1
(45) Date of Patent: Nov. 2, 2004

(54) SUPPORTED LATE TRANSITION METAL CATALYST SYSTEMS

(75) Inventors: George Alan Vaughan, Houston, TX (US); Jo Ann Marie Canich, Webster, TX (US); Phillip T. Matsunaga, Houston, TX (US); David Edward Gindelberger, Bedminster, NJ (US); Kevin Richard Squire, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 08/877,684

(22) Filed: Jun. 17, 1997

Related U.S. Application Data

(60) Provisional application No. 60/020,095, filed on Jun. 17, 1996.

(51) Int. Cl.[7] .................... B01J 31/00; B01J 32/00; C08F 4/02; C08F 4/60
(52) U.S. Cl. .................... 502/117; 502/155; 502/162; 502/167
(58) Field of Search .................... 502/155, 162, 502/117, 167

(56) References Cited

U.S. PATENT DOCUMENTS

| | | | | |
|---|---|---|---|---|
| 3,642,658 A | * | 2/1972 | Allum et al. | 502/162 |
| 3,663,451 A | * | 5/1972 | Hill | 252/431 R |
| 3,686,159 A | | 8/1972 | Bauer et al. | 260/94.9 C |
| 3,725,305 A | * | 4/1973 | Wilkinson | 502/162 |
| 3,759,889 A | | 9/1973 | Bauer et al. | 260/94.9 C |
| 4,533,651 A | * | 8/1985 | Masters et al. | 502/117 |
| 4,716,205 A | | 12/1987 | Klabunde | 526/165 |
| 4,818,810 A | * | 4/1989 | Drent | 502/162 |
| 4,849,542 A | * | 7/1989 | Drent | 502/162 |
| 4,994,534 A | * | 2/1991 | Rhee et al. | 526/88 |
| 5,026,675 A | * | 6/1991 | Braca et al. | 502/159 |
| 5,030,606 A | | 7/1991 | Klabunde | 502/155 |
| 5,055,552 A | | 10/1991 | Wong | 528/392 |
| 5,227,464 A | | 7/1993 | Keijsper | 528/392 |
| 5,237,047 A | * | 8/1993 | Keijsper | 502/162 |
| 5,266,544 A | | 11/1993 | Tsutsui et al. | 502/113 |
| 5,304,588 A | * | 4/1994 | Boysen et al. | 523/204 |
| 5,314,856 A | * | 5/1994 | Sommazzi et al. | 502/162 |
| 5,324,701 A | * | 6/1994 | Sommazzi et al. | 502/162 |
| 5,340,787 A | | 8/1994 | Keijsper | 502/162 |
| 5,408,017 A | | 4/1995 | Turner et al. | 526/134 |
| 5,502,128 A | | 3/1996 | Flores et al. | 526/160 |
| 5,714,556 A | | 2/1998 | Johnson et al. | 526/135 |
| 5,789,333 A | * | 8/1998 | Angelici et al. | 502/113 |
| 5,852,145 A | * | 12/1998 | McLain et al. | 526/133 |
| 5,866,663 A | * | 2/1999 | Brookhart et al. | 526/170 |
| 5,880,301 A | * | 3/1999 | Shibasaki et al. | 502/162 |
| 5,891,989 A | * | 4/1999 | Lippert et al. | 502/162 |
| 5,912,202 A | * | 6/1999 | Oskam et al. | 502/104 |
| 5,932,670 A | * | 8/1999 | Koppl et al. | 502/117 |

FOREIGN PATENT DOCUMENTS

| | | | | |
|---|---|---|---|---|
| DE | 280 527 | * | 7/1990 | 502/162 |
| EP | 0 006 110 | * | 1/1980 | |
| EP | 0 114 434 A | | 8/1984 | |
| EP | 0 454 231 A2 | | 10/1991 | |
| EP | 0 500 944 | * | 9/1992 | |
| EP | A1 0 612 768 | | 8/1994 | |
| EP | 0 768 319 A | | 4/1997 | |
| GB | 2 250 929 | * | 6/1992 | 502/162 |
| WO | WO 83/02907 | * | 9/1983 | 502/162 |
| WO | WO 93/25590 | | 12/1993 | |
| WO | WO 94/01471 | | 1/1994 | |
| WO | WO 96/23010 | | 8/1996 | |
| WO | WO 97/02298 | | 1/1997 | |
| WO | WO 97/48736 | | 12/1997 | |

OTHER PUBLICATIONS

"Encyclopedia of Polymer Science and Engineering", 2nd ed., vol. 7, Mark et al., eds., Wiley–Interscience, 1987, pp. vii–xi, 480–488.*

"Simultaneous Oligomerization and Polymerization of Ethylene", Denger, C., et al, Makromolekulare Chemie, Rapid Communications, vol. 12, No. 12, (1991) pp. 697–701.

Database WPI Section Ch, Week 9413, Derwent Publications Ltd., London, GB; Class A17, AN 94-107675 & SU 1 455 650 A (Krentsel B A), 15 (1993).

"Polymerization of Olefins with Noble Metal (Ru, Rh, PD) Compounds Activated By Alkylaluminium or Alkyltitanium Compounds", Kazuo Soga, et al, Makromolekulare Chemie, Rapid Communications, vol. 11, No. 6, (1990) pp. 285–291.

"New Pd(II)–and Ni(II)–Based Catalysts for Polymerization of Ethylene and α–Olefins," Johnson, et al, J. Am. Chem. Soc., pp. 6414–6415 (1995).

"New Pd(II)– and Ni(II)–Based Catalysts for Polymerization of Ethylene and α–Olefins," Johnson, et al, Dept. of Chemistry, University of North Carolina at Chapel Hill, NC—Presentation—date (unk).

* cited by examiner

Primary Examiner—Mark L. Bell
Assistant Examiner—J. Pasterczyk

(57) ABSTRACT

A late transition metal catalyst system for polymerization of olefin monomers is a Group 9, 10 or 11 metal complex stabilized by a bidentate ligand immobilized on a solid support where the late transition metal loading is less than 100 micromoles transition metal compound per gram of solid support. The bidentate ligand has the formula:

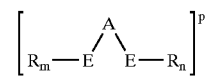

wherein A is a bridging group containing a Group 13–15 element; each E is independently a Group 15 or 16 element bonded to M; each R is independently a $C_1$–$C_{30}$ containing radical or diradical group which is a hydrocarbyl, substituted hydrocarbyl, halocarbyl, substituted halocarbyl, hydrocarbyl-substituted organometalloid, halocarbyl-substituted organometalloid, m and n are independently 1 or 2 depending on the valency of E; and p is the charge on the bidentate ligand.

58 Claims, No Drawings

SUPPORTED LATE TRANSITION METAL CATALYST SYSTEMS

This application claims the benefit of provisional No. 60/020,095 filed Jun. 17, 1996.

FIELD OF THE INVENTION

This invention relates to supported late transition metal catalyst systems, means of preparing them and polymerization of olefins using them.

BACKGROUND OF THE INVENTION

Early transition metal catalysts for olefin polymers by coordination polymerization are well-known, typically those are the traditional Ziegler-type catalysts based on Group 4 and 5 of the Periodic Table (IUPAC new nomenclature) and the newer metallocene catalysts based on Group 4–6 metals. However specific late transition metal catalysts suitable for olefin polymerization had not offered the same levels of activity or molecular weight capability for olefin polymerization during the development of these catalyst systems and additional work was published addressing this lack.

In Johnson, Killian, and Brookhart, *J. Am. Chem. Soc.*, 1995, 117, 6414 the authors describe the use of Ni and Pd complexes for the solution homopolymerization of ethylene, propylene, and 1-hexene. The catalyst precursors are square-planar, $M^{2+}$, $d^8$, 16 electron complexes incorporating substituted, bidentate diimine ligands. The active coordination sites are occupied by either methyl or bromide ligands. Methyl ligand complexes were activated with $H^+(OEt_2)_2[B(3,5-CF_3)_2C_6H_3)_4]^-$ and bromide ligand complexes were activated with methylalumoxane (MAO) or diethylaluminumchloride as cocatalysts.

European patent publication EP-A2-0 454 231 describes Group VIIIb metal catalysts said to be suitable for the polymerization of ethylene, α-olefins, diolefins, functionalized olefins, and alkynes. The described catalyst precursors are Group VIIIb metal (Groups 8, 9, 10, IUPAC new nomenclature) compounds which are subsequently activated by compounds including discrete borate anions. Ethylene homopolymerization in solutions of methylene chloride, toluene and diethyl ether are illustrated. Few polymerizations were conducted in the presence of a support material and broad molecular weight distribution polymers were produced.

The advantages recognized with the early transition metal catalysts of immobilizing the catalyst on solid supports to enable heterogeneous polymerization processes such as those based on gas phase, bulk or slurry processes would be important to effect efficient industrial utilization of the late transition metal catalysts described, and derivatives of them. In particular, due to the observed high levels of branching with the catalysts of the above literature, melting points of the resulting polymers were anticipated to be so low as to present problems with reactor operation at typical industrial operating temperatures occurring when heat dissipation by solvents is unavailable, as in continuous gas phase polymerization.

SUMMARY OF THE INVENTION

The invention encompasses late transition metal catalyst systems immobilized on solid supports and their use in heterogenous polymerization processes, particularly in gas phase polymerization of olefin monomers. Preferred embodiments include a late transition metal catalyst system comprising a Group 9, 10, or 11 metal complex stabilized by a bidentate ligand structure immobilized on a solid porous metal oxide, metalloid oxide or polymeric particle support, preferably those comprising silica. The gas phase polymerization process for olefin monomers comprises contacting one or more olefins with these catalyst systems under gas phase polymerization conditions.

DETAILED DESCRIPTION OF THE INVENTION

The polymerization catalysts of this invention can be derived from the late transition metal compounds of formula:

$$LMX_r$$

wherein M is a Group 9, 10, or 11 metal, preferably a first row metal, also preferably a $d^6$, $d^8$ or $d^{10}$ metal, most preferably $d^8$; L is a bidentate ligand that stabilizes a square planar geometry and charge balances the oxidation state of $MX_r$; each X is, independently, a hydride radical a hydrocarbyl radical, a substituted hydrocarbyl radical, a halocarbyl radical, a substituted halocarbyl radical, and hydrocarbyl- and halocarbyl-substituted organometalloid radicals; or two X's are joined and bound to the metal atom to form a metallacycle ring containing from about 2 to about 20 carbon atoms; or one or more X can be a neutral hydrocarbyl containing donor ligand, e.g., an olefin, diolefin, or aryne ligand; and r=0, 1, 2, or 3. When Lewis-acid activators, such as methylalumoxane, aluminum alkyls, or alkylaluminum halides, which are capable of donating an X ligand, as described above, to the transition metal component, are used, or when the ionic activator is capable of extracting X, one or more X may additionally be independently selected from the group consisting of a halogen, alkoxide, aryloxide, amide, phosphide or other univalent anionic ligand; two such X's joined to form an anionic chelating ligand; or, one or more neutral non-hydrocarbyl atom containing donor ligand, e.g., phosphine, amine, nitrile or CO ligand.

In a preferred embodiment of the invention, the bidentate ligand L, is defined by the following formula:

wherein A is a bridging group containing a Group 13–15 element; each E is independently a Group 15 or 16 element covalently bonded to M; each R is independently a $C_1$–$C_{30}$ containing radical or diradical group which is a hydrocarbyl, substituted-hydrocarbyl, halocarbyl, substituted-halocarbyl, hydrocarbyl-substituted organometalloid, halocarbyl-substituted organometalloid, m and n are independently 1 or 2 depending on the valency of E; and p is the charge on the bidentate ligand such that the oxidation of state of $MX_r$ is satisfied.

In the most preferred embodiment of the invention, the bridging group, A, is defined by the following formulae:

A-1

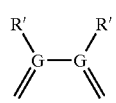

-continued

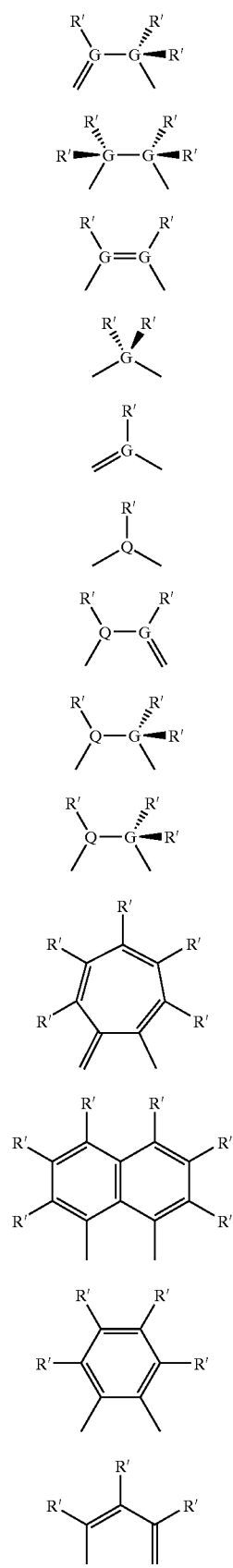

A-2
A-3
A-4
A-5
A-6
A-7
A-8
A-9
A-10
A-11
A-12
A-13
A-14 wherein G is a Group 14 element, especially C, Si, and Ge; Q is a Group 13 element, especially B and Al; and R' are independently hydride radicals, $C_1$–$C_{30}$ hydrocarbyl radicals, substituted hydrocarbyl radicals, halocarbyl radicals, substituted halocarbyl radicals, and hydrocarbyl- and halocarbyl-substituted organometalloid radicals, and optionally two or more adjacent R' may form one or more $C_4$ to $C_{40}$ rings to give a saturated or unsaturated cyclic or polycyclic ring.

Also in the most preferred embodiment of the invention, each R is independently a bulky $C_1$–$C_{30}$ containing radical group which is a hydrocarbyl, substituted-hydrocarbyl halocarbyl, substituted-halocarbyl, substituted organometalloid, hydrocarbyl-substituted organometalloid, or halocarbyl-substituted organometalloid. Bulky radical groups include phenyls, substituted phenyls, alkyls and substituted alkyls bonded to E through a tertiary carbon atom, alicyclic and polyalicyclic containing hydrocarbyls, particularly those bonded to E through a tertiary carbon and the like.

In the definitions above, the term "substituted" is as defined or refers to $C_1$–$C_{30}$ containing radicals which are to be essentially hydrocarbyl, but may include one or more non-hydrocarbyl atoms (such as Si, Ge, O, S, N, P, halogen, etc.) in place of one or more carbon atoms.

In the very most preferred embodiment of this invention, M is a group 10 metal, E is a group 15 element especially nitrogen with m and n being one and p being zero, the bridge is as drawn in A-1, and R is a substituted phenyl group preferably substituted in at least the 2 and 6 positions with non-hydride R' groups. For high molecular weight polymers, R' is preferably $C_3$–$C_{30}$, preferably with a secondary or tertiary carbon atom bonded to the phenyl group.

For the purposes of this patent specification, the terms "cocatalysts or activators" are used interchangeably and are defined to be any compound or component which can activate the late transition metal compound.

The late transition metal catalyst compounds according to the invention may be activated into the invention catalyst complexes for polymerization catalysis in any manner sufficient to allow coordination polymerization. This can be achieved, for example, when one X ligand can be abstracted and the other X will either allow insertion of the unsaturated monomers or will be similarly abstractable for replacement with an X that allows insertion of the unsaturated monomer. Traditional organometallic compound Ziegler cocatalysts may be utilized. Additionally, the traditional activators of metallocene polymerization art are suitable activators; those typically include Lewis acids such as alumoxane compounds, and ionizing, anion pre-cursor compounds that abstract one X so as to ionize the transition metal center into a cation and provide a counterbalancing, compatible, non-coordinating anion.

In general, the late transition metal compound may be activated with an alumoxane, Ziegler cocatalyst, "noncoordinating anion" precursor compounds and halide salts of the Group 13–16 metals each of which is described more fully below.

The Ziegler cocatalyst will typically be a organometallic compound of a metal of Groups 1, 2, 12 or 13 of the Periodic table of elements. Preferred are organoaluminum compounds selected from the group consisting of aluminum alkyl, aluminum alkyl halide and aluminum halide. These can be represented by the formulae:

$Al(R^1)_s X'_{3-s}$, wherein $R^1$ is independently a hydride or $C_1$ to $C_{10}$ hydrocarbyl radicals including aliphatic, alicyclic or aromatic hydrocarbon radical X' is a halogen and s is an integer from 0 to 3; and,

which are hydrocarbylaluminum sesquihalides. Examples include triethylaluminum, triisobutylaluminum, diethyl aluminum chloride, $Al_2Et_3Cl_3$ and $Al_2(i\text{-}Bu)_3Cl_3$.

Alkylalumoxanes and modified alkylalumoxanes are suitable as catalyst activators. The alumoxane component useful as catalyst activator typically is an oligomeric aluminum compound represented by the general formula $(R^2\text{—}Al\text{—}O)_n$, which is a cyclic compound, or $R^2(R^2\text{—}Al\text{—}O)_n AlR^2_2$, which is a linear compound. In the general alumoxane formula $R^2$ is independently a $C_1$ to $C_{10}$ hydrocarbyl radical, for example, methyl, ethyl, propyl, butyl or pentyl and "n" is an integer from 1 to about 100. Most preferably, $R^2$ is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane. Methylalumoxane and modified methylalumoxanes are preferred. For further descriptions see, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 131, EP 0 516 476 A, EP 0 594 218 A1 and WO 94/10180, each being incorporated by reference for purposes of U.S. patent practice.

For the immobilized catalyst systems of the invention when the activator is an alumoxane, the preferred transition metal compound to activator molar ratio is from 1:500 to 10:1, more preferably from about 1:200 to 10:1, even more preferably from about 1:120 to 1:1.

The term "noncoordinating anion" as used for the ionizing, anion pre-cursor compounds ("noncoordinating anion precursors") is recognized to mean an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex between the late-transition-metal catalyst compounds and the ionizing, anion pre-cursor compounds decomposes. Further, the anion will not transfer an anionic substituent or fragment to the cation so as to cause it to form a neutral four coordinate metal compound and a neutral by-product from the anion. Noncoordinating anions useful in accordance with this invention are those which are compatible, stabilize the late-transition-metal cation in the sense of balancing its ionic charge, yet retain sufficient lability to permit displacement by an olefinically unsaturated monomer during polymerization. Additionally, the anions useful in this invention will be of sufficient molecular size to partially inhibit or help to prevent neutralization of the late-transition-metal cation by Lewis bases other than the polymerizable monomers that may be present in the polymerization process.

Descriptions of ionic catalysts, those comprising a transition metal cation and a noncoordinating anion, suitable for coordination polymerization appear in the early work in U.S. Pat. Nos. 5,064,802, 5,132,380, 5,198,401, 5,278,119, 5,321,106, 5,347,024, 5,408,017, WO 92/00333 and WO 93/14132. These teach a preferred method of preparation wherein metallocenes are protonated by an anion precursor such that an alkylhydride group is abstracted from a transition metal to make it both cationic and charge-balanced by the noncoordinating anion. These teachings are useful to those skilled in the art for the late-transition-metal catalysts of the present invention The use of ionizing ionic compounds not containing an active proton but capable of producing both the active metal cation and a noncoordinating anion is also known. See, EP-A-0 426 637, EP-A-0 573 403 and U.S. Pat. No. 5,387, 568. Reactive cations other than the Brönsted acids include ferricenium, silver, tropylium, triphenylcarbenium and triethylsilylium, or alkali metal or alkaline earth metal cations such as sodium, magnesium or lithium cations. A further class of noncoordinating anion precursors suitable in accordance with this invention are hydrated salts comprising the alkali metal or alkaline earth metal cations and a noncoordinating anion as described above. The hydrated salts can be prepared by reaction of the metal cation-noncoordinating anion salt with water, for example, by hydrolysis of the commercially available or readily synthesized $LiB(pfP)_4$ which yields $[Li \cdot xH_2O][B(pfp)_4]$, where (pfp) is pentafluorophenyl or perfluorophenyl.

Any metal or metalloid capable of forming a coordination complex, which preferably is resistant to degradation by water (or other Bronsted or Lewis Acids), may be used or contained in the anion. Suitable metals include, but are not limited to, aluminum, gold, platinum and the like. Suitable metalloids include, but are not limited to, boron, phosphorus, silicon and the like. The description of noncoordinating anions and precursors thereto of the documents of the foregoing paragraphs are incorporated by reference for purposes of U.S. patent practice.

An additional method of making the ionic catalysts uses noncoordinating anion precursors which are initially neutral Lewis acids but form the cation and anion upon ionizing reaction with the late transition metal compounds, for example tris(pentafluorophenyl)boron acts to abstract a hydrocarbyl, hydride or silyl ligand to yield a late-transition-metal cation and stabilizing noncoordinating anion; see EP-A0 427 697 and EP-A-0 520 732 which are directed to metallocene catalyst systems. Ionic catalysts for coordination polymerization can also be prepared by oxidation of the metal centers of transition metal compounds by anionic precursors containing metallic oxidizing groups along with the anion groups, see EP-A-0 495 375. The description of noncoordinating anions and precursors thereto of these documents are similarly incorporated by reference for purposes of U.S. patent practice.

When the cation portion of an ionic noncoordinating precursor is a Brönsted acid such as protons or protonated Lewis bases, or a reducible Lewis acid such as ferricenium or silver cations, or alkali metal or alkaline earth metal cations such as those of sodium, magnesium or lithium cations, the transition metal to activator molar ratio may be any ratio, but preferably from about 10:1 to 1:10; more preferably from about 5:1 to 1:5; even more preferably from about 2:1 to 1:2; and most preferably from about 1.2:1 to 1:1.2 with the ratio of about 1:1 being the most preferred. Similar ratios may be used for other noncoordinating anion precusor compounds.

The late transition metal catalyst compounds of this invention may also be activated with ionizing anion precursors including the halide salts of Group 13–16 metals or metalloids, preferably the fluoride and oxyfluoride salts, e.g., those providing the following anions: $BF_4^-$, $PF_6^-$, $SbF_6^-$, $TeOF_6^-$ and $AsF_6^-$.

When halide salts of Group 13–16 metals or metalloids are used as the activator, the preferred total transition metal compound to activator molar ratio is preferably from 10:1 to 1:10, more preferably from about 5:1 to 1:5, even more preferably from 2:1 to 1:2, and even more preferably from 1.2:1 to 1:1.2 with 1:1 being most preferred. Higher and lower ratios may also be used.

When using ionic catalysts of the late transition metal complexes comprising cations and noncoordinating anions, the total catalyst system can additionally comprise one or more scavenging compounds. The term "scavenging compounds" is meant to include those compounds effective for removing polar impurities from the reaction environment. Impurities can be inadvertently introduced with any of the polymerization reaction components, particularly with solvent, monomer and catalyst feed, and adversely affect catalyst activity and stability. Impurities can result in decreased, variable or even elimination of catalytic activity. The polar impurities, or catalyst poisons include water, oxygen, metal impurities, etc. While the late transition metal catalysts of the present invention can be less sensitive to impurities than metallocene catalyst systems, reduction or elimination of poisons remains a viable option. Preferably steps are taken before provision of such into the reaction vessel, for example by chemical treatment or careful separation techniques after or during the synthesis or preparation of the various components; some minor amounts of scavenging compound can still normally be used in the polymerization process itself.

Typically the scavenging compound will be an organometallic compound such as the Group 13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminoxane, and n-octyl aluminum. Those scavenging compounds having bulky or $C_8$–$C_{20}$ linear hydrocarbyl substituents covalently bound to the metal or metalloid center being preferred to minimize adverse interaction with the active catalyst. When alumoxane or Ziegler co-catalyst is used as activator, any excess over the amount of late-transition-metal present will act as scavenger compounds and additional scavenging compounds may not be necessary. The amount of scavenging agent to be used with late-transition-metal cation-noncoordinating anion pairs is minimized during polymerization reactions to that amount effective to enhance activity.

The catalyst systems of this invention can additionally be prepared by combining in any order the bidentate ligand L, or a known precursor to it, with a suitable late transition metal complex, and an activator compound. For example, the bidentate ligand L precursor $(2,6\text{-i-Pr}_2C_6H_3N=CH)_2$ may be added to the late transition metal complex $NiBr_2 \bullet MeOCH_2CH_2OMe$ in a solvent such as toluene having the activator compound methylalumoxane dissolved therein. Optionally, oxidizing or reducing agents may be used additionally to achieve the preferred $d^6$, $d^8$ or $d^{10}$ metal compounds. All reactants may be added in any order, or even essentially simultaneously.

The supported catalyst can be prepared in an appropriate solvent which may be any of aliphatic or aromatic hydrocarbon solvents, halocarbon solvents such as methylene chloride and difluorobenzene, or may be polar or protic solvents such as water. The halocarbon or polar solvents are preferred when the late transition metal compounds, $LMX_{r}$, are not soluble in hydrocarbon solvents. Typically the aromatic hydrocarbon solvents are more suitable than the aliphatic solvents for dissolving the late transition metal compound. Further, the aromatic hydrocarbon solvents can be used for late transition metal compounds having limited solubility in those solvents when the metal compounds have been solubilized with a suitable activator, for example, as with activation by methylalumoxane in an aromatic solvent. Significant dissolution of the metal compounds is important for the preparation of homogeneous, supported catalysts. The term "homogeneous, supported catalysts" means that the metal compounds, or their activated complexes, approach even distribution upon the accessible surface area of the support, including interior pore surfaces in the preferred porous supports.

The immobilized catalyst systems of the invention may be prepared by any effective method of supporting other coordination catalyst systems, effective meaning that the catalyst so prepared can be used for preparing polymer in a heterogeneous polymerization process. Preferred methods include those referred to in copending U.S. application Ser. No. 08/466,547, filed 6 Jun. 1995, and in its counterpart WO 96/00245. In accordance with this method, as illustrated in the examples below, the late transition metal compound is combined with an activator compound in solvent to prepare a precursor solution which is added to a porous support particle in such a manner that the total solvent volume exceeds the total particle pore volume but is less than that at which the formation of a slurry is observed.

Another preferred method of immobilizing the catalyst systems of the invention are described in co-pending U.S. application Ser. No. 08/474,948, filed Jun. 7, 1995 now U.S. Pat. No. 5,648,841, and published as WO 96/04319. In this method ionic catalyst systems chemically bound to the support are prepared. A neutral Lewis acid ionizing compound (such as trisperfluorophenylboron) is reacted with hydroxyl group-containing metal oxide supports, preferably complexed with a Lewis base, and then reacted with the transition metal precursor compound which is activated by protonation. The late transition metal activated complex is then ionically balanced by the noncoordinating anion chemically bound to the support.

The activated catalyst may also be supported in accordance with WO 91/0882 and WO 94/03506, particularly when using ionizing activators providing electronically stabilizing noncoordinating anions. In this method, inorganic oxide particle supports are treated with a Lewis acid to neutralize any hydroxyl groups remaining on the surfaces after thorough drying and prior to the adsorption of the activated catalyst complex from the solution in which it is added.

The support method of Example 11–16 in copending U.S. application Ser. No. 08/549,991, filed 30 Oct. 1995, now U.S. Pat. No. 5,712,352 and in WO 96/08520 will also be suitable in accordance with this invention.

Additional methods appear in the following descriptions for metallocene catalysts, these methods will be suitable as well for the invention catalyst systems. U.S. Pat. No. 4,937,217 generally describes a mixture of trimethylaluminum and triethylaluminum added to an undehydrated silica to which a metallocene catalyst component is then added. EP-308177-B1 generally describes adding a wet monomer to a reactor containing a metallocene, trialkylaluminum and undehydrated silica. U.S. Pat. Nos. 4,912,075, 4,935,397 and 4,937,301 generally relate to adding trimethylaluminum to an undehydrated silica and then adding a metallocene to form a dry supported catalyst system. U.S. Pat. No. 4,914,253 describes adding trimethylaluminum to undehydrated silica, adding a metallocene and then drying the resulting supported catalyst system with an amount of hydrogen to produce a polyethylene wax. U.S. Pat. Nos. 5,008,228, 5,086,025 and 5,147,949 generally describe forming a dry supported catalyst system by the addition of trimethylaluminum to a water impregnated silica to form alumoxane in situ and then adding the metallocene. U.S. Pat. Nos. 4,808,561, 4,897,455 and 4,701,432 describe techniques to form a supported catalyst where the inert carrier, typically silica, is calcined and contacted with a metallocene(s) and an activator/cocatalyst component. U.S. Pat. No. 5,238,892 describes forming a dry supported catalyst system by mixing a metallocene with an alkyl aluminum and then adding undehydrated silica. U.S. Pat. No. 5,240,894 generally pertains to forming a supported metallocene/alumoxane catalyst system by forming a metallocene/alumoxane reaction solution, adding a porous carrier, and evaporating the resulting slurry to remove essentially all residual solvent from the carrier.

Polymeric carriers will also be suitable in accordance with the invention, see for example the descriptions in WO 95/15815 and U.S. Pat. No. 5,427,991. As taught for metallocene catalysts in these documents, the catalyst complexes of this invention may be either adsorbed or absorbed, on the polymeric supports, particularly if made up of porous particles, or may be chemically bound through functional groups covalently bound to or in the polymer chains.

Suitable solid particle supports are typically comprised of polymeric or refractory oxide materials, each being preferably porous, such as for example, talc, inorganic oxides, inorganic chlorides, for example magnesium chloride, and resinous support materials such as polystyrene polyolefin or polymeric compounds or any other organic support material and the like that has an average particle size preferably greater than 10 $\mu$m.

The preferred support materials are inorganic oxide materials, which include those from the Periodic Table of Elements of Groups 2, 3, 4, 5, 13 or 14 metal or metalloid oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention has a surface area in the range of from about 10 to about 700 m$^2$/g, pore volume in the range of from about 0.1 to about 4.0 cc/g and average particle size in the range of from about 10 to about 500 $\mu$m. More preferably, the surface area is in the range of from about 50 to about 500 m$^2$/g, pore volume of from about 0.5 to about 3.5 cc/g and average particle size of from about 20 to about 200 $\mu$m. Most preferably the surface area range is from about 100 to about 400 m$^2$/g, pore volume from about 0.8 to about 3.0 cc/g and average particle size is from about 30 to about 100 $\mu$m. The pore size of the carrier of the invention typically has pore size in the range of from 10 to 1000 Å, preferably 50 to about 500 Å, and most preferably 75 to about 350 Å.

The catalysts of this invention are generally deposited on the support at a loading level of 100 to 10 micromoles of transition metal compound to gram of solid support; more preferably from 80 to 20 micromoles of transition metal compound to gram of solid support; and most preferably from 60 to 40 micromoles of transition metal compound to gram of solid support. While the catalyst can be deposited on the support at any level up to the pore volume of the support, loading levels of less than 100 micromoles of transition metal compound to gram of solid support are preferred, with less than 80 micromoles of transition metal compound to gram of solid support being even more preferred, and less than 60 micromoles of transition metal compound to gram of solid support being most preferred.

Gas phase processes use supported catalysts and are conducted under gas phase conditions suitable for ethylene homopolymers or copolymers prepared by coordination polymerization. Illustrative examples may be found in U.S. Pat. Nos. 4,543,399, 4,588,790, 5,028,670, 5,352,749, 5,382,638, 5,405,922, 5,422,999, 5,436,304, 5,453,471, and 5,463,999, and International applications WO 94/28032, WO 95/07942 and WO 96/00245. Each is incorporated by reference for purposes of U.S. patent practice. Typically the processes are conducted at temperatures of from about −100° C. to 150 ° C., preferably from about 40° C. to 120° C., at pressures up to about 7000 kPa, typically from about 690 kPa to 2415 kPa Continuous processes using fluidized beds and recycle streams as the fluidizing medium are preferred.

Slurry polymerization processes, including loop slurry, in which the immobilized catalyst systems of this invention may be used are typically described as those in which the polymerization medium can be either a liquid monomer, like propylene, or a hydrocarbon solvent or diluent, advantageously aliphatic paraffin such as propane, isobutane, hexane, heptane, cyclohexane, etc. or an aromatic one such as toluene. The polymerization temperatures may be those considered low, e.g., less than 50° C., preferably 0–30° C., or may be in a higher range, such as up to about 150° C., preferably from 50° C. up to about 80° C., or at any ranges between the end points indicated. Pressures can vary from about 100 to about 700 psia (0.76–4.8 MPa). Additional description is given in U.S. Pat. Nos. 5,274,056 and 4,182,810 and WO 94/21962 which are incorporated by reference for purposes of U.S. patent practice. Preferably for both gas phase and slurry process the polymerization reaction temperatures will be maintained at a temperature at least 10° C., below the melting point of the polymer being produced.

In the process manner discussed above with the invention catalysts described in this application, unsaturated monomers, that is olefinically or ethylenically unsaturated monomers, may be polymerized so as to form polymer products having molecular weights (weight-average or M$_w$) from about 500 to about 3×10$^6$. Most typically, the polymer products will have an M$_w$ of from about 1000 to about 1.0×10$^6$ and will have narrow molecular weight distribution from about 1.9–4.0. Suitable unsaturated monomers will include ethylene, C$_3$–C$_{20}$ α-olefins, C$_4$–C$_{20}$ cyclic olefins, C$_4$–C$_{20}$ non-conjugated diolefins, C$_4$–C$_{20}$ gem-substituted olefins, or C$_{20}$–C$_{1000}$ α-olefin macromers, and C$_8$–C$_{20}$ aromatic substituted olefins. Preferably the polymer products will be any of polyethylene homopolymers, ethylene copolymers, particularly polyethylene plastomers and elastomers. And, in view of the known tolerance of the catalysts to polar monomers, ethylenically unsaturated polar monomers will additionally be polymerizable or copolymerizable. The preferred polar monomers include C$_4$–C$_{20}$ olefins containing functional groupings such as esters, carboxylates, nitriles, amines, amides, alcohols, halides carboxylic acids and the like. More preferably vinyl esters, halides and nitrites. Also, the masked monomers of U.S. Pat. No. 4,987,200 are also suitable.

Preferred polymer products enabled through the practice of this invention can have unexpected higher melting points than polymers from similar unsupported catalyst complexes when used in solution polymerization processes. Thus polymers with melting points of at least 125° C. will be possible despite the branch-producing tendencies of these late transition metal complexes.

Another important characteristic of the polymer of the invention is its composition distribution (CD). A measure of composition distribution is the "Composition Distribution Breadth Index"("CDBI"). CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions are assumed to have a $Mn \geq 15,000$, where Mn is the number average molecular weight fraction. Low weight fractions generally represent a trivial portion of the polymer of the present invention. The remainder of this description and the appended claims maintain this convention of assuming all weight fractions have a $Mn \geq 15,000$ in the CDBI measurement.

From the weight fraction versus composition distribution curve the CDBI is determined by establishing what weight percent of the sample has a comonomer content within 25% of each side of the median comonomer content. Further details of determining the CDBI of a copolymer are known to those skilled in the art. See, for example, PCT patent application WO 93/03093, published Feb. 18, 1993.

The polymers of the present invention in one embodiment have CDBI's generally in the range of greater than 50% to 99%, preferably in the range of 50% to 85%, and more preferably 55% to 80%, even more preferably greater than 60%, still even more preferably greater than 65%. Obviously, higher or lower CDBI's may be obtained using other catalyst systems with changes in the operating conditions of the process employed.

For the following examples, all molecular weights are weight average molecular weight unless otherwise noted.

Molecular weights (weight average molecular weight ($M_w$) and number average molecular weight ($M_n$) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III'" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision with 0.1 units for $M_w/M_n$ which was calculated from elution times. The numerical analyses were performed using Expert Ease' software available from Waters Corporation.

EXAMPLES

Preparation of Supported Catalysts

Transition metal precursors used to illustrate the invention were those described in Table I.

TABLE I

Transition Metal Precursor Structures.

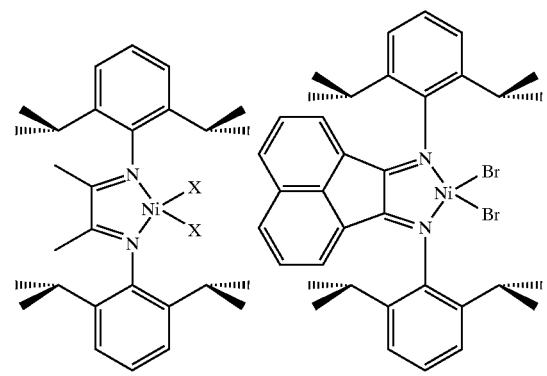

| Structure | | | $(C_5Me_5)_2ZrCl_2$ | $(C_5H_5)_2ZrCl_2$ |
|---|---|---|---|---|
| Designation | TM-1, X = Cl<br>TM-2, X = Br<br>TM-3, X = Me | TM-4 | TM-5 | TM-6 |

Example 1

General Supporting Method

An aluminoxane, such as methylalmoxane or modified alumoxane, or other suitable activator such as $Al(CH_3)_3$, $Al(CH_2CH_3)_2Cl$, $B(C_6F_5)_3$, $[C_6H_5NMe_2H]^+[B(C_6F_5)_4]^-$, $[(C_6H_5)_3C]^+[B(C_6F_5)_4]^-$, $[H]^+[BF_4]^-$, $[H]^+[PF_6]^-$, $[Ag]^+[BF_4]^-$, $[Ag]^+[PF_6]^-$, or $[Ag]^+[B(C_6F_5)_4]^-$ is combined with one or more transition metal complexes in an appropriate solvent to form a precursor solution. A suitable support, preferably porous, is charged to a vessel and the precursor solution is added with stirring. The mixture may be mixed by hand with a spatula, by a rotating stirrer with wire loops such as a Kitchen Aid dough mixer, by metal blades rotating at high speed such as in a Waring blender, by a helical ribbon bladed mixer, by shaking, tumbling, fluidized bed mixing, by paddle or propeller blades on a rotating stir shaft, or other appropriate means. The total amount of solvent used to form the precursor suspension or solution may be less than the pore volume of the support as in impregnation to incipient wetness, or greater than the pore volume of the support such that a slurry is formed, or an amount in between such that a solution-finely divided support mixture is neither free flowing nor a slurry. Solution may be added to support or vice versa as appropriate to the mixing method. If desired the liquids may be removed by purging with an inert gas or under vacuum.

Support Method

An aluminoxane or suitable activator was combined with the transition metal complexes in toluene to form a precursor solution. The solution was charged to a vessel and the porous support added all at once and the mixture stirred by hand with a spatula The total volume of the precursor solution was greater than the pore volume of the support, but not enough to reach the point of gelation or form a slurry, about 100%–200% pore volume. The solvent was removed in vacuo (press.<200 mTorr) and ambient temperature overnight, about 12–16 hr.

The aluminoxane used was 30 wt % methyl aluminoxane supplied in toluene by Albemarle. The silica was MS948 (1.6 cc/g P.V. (P.V.=Pore Volume), Davison Chemical Co) previously heated at 600° C. under $N_2$ for 3 hours, and the toluene was air and moisture free from Exxon Chemical.

TABLE II

Supported Catalyst Preparation Data.

| Ex. | Method | TM used | TM (mg) | TM (μmol) | MAO (g) | Tol. (g) | $SiO_2$ (g) | TM μmol/g support | P.V. soln.* |
|---|---|---|---|---|---|---|---|---|---|
| S-1 | 1 | TM-1 | 88 | 165 | 3.9 | 1.8 | 3.0 | 55 | 1.3 |
| S-2 | 1 | TM-2 | 106 | 170 | 3.9 | 1.8 | 3.0 | 57 | 1.3 |
| S-3 | 1 | TM-4 | 118 | 164 | 3.9 | 1.8 | 3.0 | 55 | 1.3 |
| S-4 | 1 | TM-4 | 1200 | 1668 | 38.1 | 38.9 | 30.0 | 56 | 1.7 |
| S-5 | 1 | TM-4 | 1204 | 1674 | 38.1 | 38.9 | 30.0 | 56 | 1.7 |

*P.V. soln. = Ratio of total precursor solution volume to support Pore Volume (cc/g).

Polymerization Reaction Examples

Polymerization Method 1

Continuous Fluidized Bed Gas Phase Polymerizations

Under conditions described in copending U.S. application Ser. No. 08/466,547, filed 6 Jun. 1995, and in WO 96/00245, a continuous cycle fluidized bed gas phase polymerization reactor was used for the ethylene polymerization studies summarized in Tables III and IV. The approximate dimensions of the reactor section above the distributor plate and below the disengaging head were 4 in. (10.2 cm.) in diameter and 24 in. (61 cm.) in length. Total operating pressure was 314.7 psia (2170 kPa) (gas compositional makeup described in Table III with the balance being $N_2$) and polymer samples were collected after several bed turnovers. Detailed process descriptions are given in Table III and product characterization data in Table IV.

TABLE III

Polymerization Method 1 Process Conditions.

| Example | Catalyst | $C_2$ mol % | $H_2/C_2$[1] | ° C. | Bed Turnovers[2] | g PE/ g Cat |
|---|---|---|---|---|---|---|
| P1-1 | S-4 | 60.4 | 0.1 | 39.2 | 2.7 | 228 |
| P1-2 | " | 62.1 | 1.4 | 41.6 | 5.0 | 344 |
| P1-3 | S-5 | 69.4 | 14.6 | 43.5 | 2.8 | 343 |
| P1-4 | " | 70.2 | 14.8 | 54.5 | 4.1 | 367 |
| P1-5 | " | 70.4 | 19.8 | 63.0 | 3.1 | 296 |

[1]mol ppm $H_2$/mol % C
[2]Number of times the starting polymer bed displaced.
[3]Productivity based upon material balance of catalyst fed into reactor and polymer removed.

TABLE IV

Polymerization Method 1 Product Data.

| Ex. | Catalyst | Density | Melt Index[1] | MP ° C.[2] | Branch $^1$H NMR[3] | $M_W$[4] ($10^{-3}$) | MWD |
|---|---|---|---|---|---|---|---|
| P1-1 | S-4 | 0.9107 | no flow | 117.2 | 18.4 | 564 | 2.77 |
| P1-2 | " | 0.9105 | no flow | nm | 20.4 | 665 | 2.70 |
| P1-3 | S-5 | 0.9103 | no flow | 118.86 | 19.6 | 590 | 2.80 |
| P1-4 | " | 0.9061 | no flow | 115.9 | 26.5 | 525 | 2.86 |
| P1-5 | " | 0.9013 | no flow | 91.0, 114.4 | 33.6 | 435 | 2.68 |

[1]No significant flow under standard ASTM melt indexes conditions.
[2]Peak melting temperatures by DSC.
[3]Methyl groups per 1000 carbons
[4]Samples showed some mass loss during GPC analysis.

Polymerization Method 2

Semi Batch Slurry Polymerizations

Conditions of the polymerization examples are given in Table V. Polymerizations were performed in 400 mL of dry hexane in a nitrogen purged 1 L Zipperclave reactor (Autoclave Engineers) equipped with an external temperature control jacket. In a glove box a charge of the supported catalyst, usually 50 to 200 mg, was loaded into a short length of SS tubing between two ball valves and backed by a small bomb containing 20 mL dry hexane. This device was attached to the reactor under an $N_2$ purge. Unless noted otherwise, cocatalyst (0.200 mL 25 wt % triethylaluminum in heptane) was injected into the reactor as well as comonomer, if noted, and the mixture heated to operating temperature with stirring. Stirring was stopped and the catalyst flushed into the reactor by the hexane backed with ethylene or nitrogen pressure. Stirring was immediately restarted while the reactor reached its regulated operating pressure corrected for solvent vapor pressure.

After sufficient reaction occurred the reactor was vented and the contents slowly poured into a beaker with 1 L of stirred acetone under air and filtered. Alternately the solvent could be removed under vacuum or by an impinging nitrogen stream. The separated polymer samples were then dried overnight in a vacuum drying oven at about 50° C.

Comparative Polymerization Method 3

Semi Batch Solution/Suspension Polymerizations

Conditions of the polymerization examples are given in Table V. Polymerizations were performed as in Method 2 with the following exceptions. No triethylaluminum was used. Instead 10 wt % methylaluminoxane in toluene from Witco was introduced into the reactor as both scavenger and activator. The transition metal compounds were introduced into the reactor as solutions in toluene.

Comparative Polymerization Method 4

Semi Batch Polymerization in Tolune

This is a method of the comparative examples ($C_1$–$C_3$) disclosed in Brookhart, et al, supra.

Comparative Polymerization Method 5

Semi Batch Solution/Supension Polymerization

Conditions of the polymerization examples are given in Table V. Polymerizations were performed as in Method 3 with the following exception: toluene was used as the polymerization solvent.

TABLE V

Batch Slurry and Solution Polymerization Data (Methods 2–4).

| Ex | Cat. | Method | $C_2^=$ psia | ° C. | min | Cat mg[1] | TM μmol | activ. μmol | Ratio activ. to $TM^2$ (Al/M) | Yield g | Ratio g PE to g cat.[3] | $C_6^=$ mL |
|---|---|---|---|---|---|---|---|---|---|---|---|---|
| C-1 | TM-4 | 4 | 14.7 | 0 | 30 | — | 0.83 | 1532 | 1837 | 2.2 | 3667 | 0 |
| C-2 | TM-4 | 4 | 58.8 | 0 | 30 | — | 0.83 | 1532 | 1837 | 2.1 | 3500 | 0 |
| C-3 | TM-4 | 4 | 14.7 | 25 | 30 | — | 0.83 | 1532 | 1837 | 1.8 | 3000 | 0 |
| P2-1 | S-2 | 2 | 75.0 | 60 | 90 | 200 | 7.93 | — | 116 | 11.6 | 58 | 0 |
| P2-2 | S-4 | 2 | 75.0 | 60 | 30 | 200 | 7.83 | — | 115 | 5.1 | 26 | 0 |
| P2-3 | S-2 | 2 | 300.0 | 30 | 30 | 100 | 3.97 | — | 116 | 4.1 | 41 | 0 |
| P2-4 | S-2 | 2 | 75.0 | 30 | 90 | 100 | 3.97 | — | 116 | 5.1 | 51 | 0 |
| P3-1 | TM-3 | 3 | 75.0 | 60 | 30 | — | 10.13 | 1532 | 151 | 19.4 | 3880 | 0 |
| P3-2 | TM-4 | 3 | 75.0 | 60 | 30 | — | 6.95 | 1532 | 220 | 30.4 | 6080 | 0 |
| P3-3 | TM-3 | 3 | 75.0 | 60 | 30 | — | 10.13 | 1532 | 151 | 12.2 | 2440 | 45 |
| P3-4 | TM-4 | 3 | 75.0 | 60 | 30 | — | 3.48 | 1532 | 441 | 6.4 | 2560 | 45 |
| C-4 | TM-2 | 5 | 80.0 | 60 | 30 | — | 1.00 | 1532 | 1540 | 6.6 | 10.600 | 0 |
| C-5 | TM-2 | 5 | 80.0 | 60 | 30 | — | 1.00 | 1532 | 1540 | 5.4 | 8710 | 0 |
| C-6 | TM-3 | 5 | 80.0 | 60 | 30 | — | .99 | 1532 | 1540 | 4.5 | 9180 | 0 |
| C-7 | TM-3 | 5 | 80.0 | 60 | 30 | — | .99 | 1532 | 1540 | 4.3 | 8780 | 0 |

C-X = Polymerization Comparative No. X; TM = transition metal; PE = polyethylene; $C_2^=$ = ethylene; $C_6^=$ = hexene; activ. = activator.
[1]Amount of supported catalyst added to reactor.
[2]Unless noted the activator is MAO and activ./TM is the ratio of Al to TM based on the Al analysis of the MAO.
[3]Grams polyethylene per gram supported catalyst or g transition metal complex.

TABLE VI

Batch Slurry and Solution Polymerization Data (Methods 2–3).

| Ex | Cat. | Method | $M_W \times 10^{-3}$ | MWD | $^1$H-NMR[1] | $^{13}$C-NMR[2] | MP (° C.) | hexene mL |
|---|---|---|---|---|---|---|---|---|
| C-1 | TM-4 | 4 | 1600 | 2.4 | 24.0 | nm[3] | 112 | 0 |
| C-2 | TM-4 | 4 | 1400 | 2.3 | 5.0 | nm | 122 | 0 |
| C-3 | TM-4 | 4 | 410 | 2.2 | 71.0 | nm | 39 | 0 |
| P2-1 | S-2 | 2 | 325 | 2.8 | nm | 74.7 | nm | 0 |
| P2-2 | S-4 | 2 | 76 | 1.9 | 80.1 | nm | nm | 0 |
| P2-3 | S-2 | 2 | 1080 | 2.8 | nm | 13.0 | nm | 0 |
| P2-4 | S-2 | 2 | 608 | 3.0 | nm | 59.2 | nm | 0 |
| P3-1 | TM-3 | 3 | 353 | 2.0 | 88.6 | nm | nm | 0 |
| P3-2 | TM-4 | 3 | 185 | 2.1 | 89.0 | 86.4 | nm | 0 |
| P3-3 | TM-3 | 3 | 427 | 2.0 | 97.8 | nm | nm | 45 |
| P3-4 | TM-4 | 3 | 207 | 2.1 | 96.9 | 97.4 | nm | 45 |
| C-4 | TM-2 | 5 | 353 | 2.3 | 80.0 | — | — | 0 |
| C-5 | TM-2 | 5 | 316 | 2.3 | 82.0 | — | — | 0 |
| C-6 | TM-3 | 5 | 374 | 2.3 | 78.0 | — | — | 0 |
| C-7 | TM-3 | 5 | 361 | 2.3 | 73.0 | — | — | 0 |

C-X = Polymerization Comparative No. X; TM = transition metal;
[1]Me groups per 1000 carbons.
[2]Branches per 1000 carbons.
[3]nm = not measured

TABLE VII

Predicted vs. Observed Branching in Continuous Flow Fluidized Bed Gas Phase Polymerization.

| Ex. | Cat | °C. | psid (kPa) | Me/$10^3$C | MP °C. | density | |
|---|---|---|---|---|---|---|---|
| C-1 | TM-4 | 0 | 14.7 (101) | 24 | 112 | — | — |
| C-2 | TM-4 | 0 | 58.8 (405) | 5 | 122 | — | −0.431 branch/psi vs. C-1 |
| C-3 | TM-4 | 25 | 14.7 (101) | 71 | 39 | — | +1.88 branch/° C. vs. C-1 |
| calculated | TM-4 | 63 | 222 (1531) | 53 | 66 | — | Extrapolated from C-2 |
| Comp.* | — | — | — | 83 | 30 | — | — |
| P1-5 | S-5 | 63 | 222 (1531) | 33.6 | 91 | .901 | |

*Commercial ethylene copolymer, Vistalon ™ EP rubber 203, with 18.3 mol. % ethylene and 81.7 mol. % propylene (Exxon Chemical Co.)

From examination of Table VII and examples C-1 to C-3 reported by Brookhart, et al, supra, we observed that branching of the polymer C-1 decreased from 24 branches/1000 carbon atoms at 14.7 psia ethylene to 5 branches/1000 carbon atoms in C-2 at 58.8 psia ethylene. From this, one skilled in the art is led to believe that branching would decrease by 0.431 branches per one psid increase in pressure (0.063 branches/kPa). Similarly comparing examples C-1 and C-3 one skilled in the art is led to believe that branching would increase by 1.88 per ° C. of temperature increase. From these observations it would appear that upon increasing both temperature and pressure from those of example C-2 (58.8 psi (405 kPa), 0° C.) to those of the typical continuous cycle fluidized bed gas phase polymerization process in example P1-5 (222 psia (1531 kPa), 63° C.) the branching would increase from 5 branches/1000 carbon atoms to about 53 branches/1000 carbon atoms. By comparing branch counts vs. MP for the three examples C-1, C-2 and C-3 as well as a commercial ethylene copolymer (Vistalon™ EP Rubber 203) and the polymer obtained from the supported catalyst of example P1-5, a linear relationship is derived such that MP=−1.275(#Me/100° C.)+134.038 with R=0.991. Using this equation, one would predict that a polymer having 53 branches/1000 carbon atoms would have a MP of 66° C. This is very near the typical operating temperature of commercially viable gas phase polymerization processes and would likely result in fusion of partially melted polymer particles formed in the reactor and consequent loss of fluidization. Surprisingly, however, under the conditions examined in Tables III and IV, these difficulties were not observed. Instead, the polymer produced had 34 branches 1000 carbon atoms and MP of 91° C. rather than the calculated 53 branches/1000 carbon atoms and MP of 66° C. Additionally, the particle morphology observed was excellent and the production of fines was low.

Additionally, it was observed that the selection of a late transition metal catalyst system and its being immobilized on a solid particle support for slurry polymerization in accordance with the invention resulted in unexpected modifications in the polymer characteristics. The late transition metal catalyst system TM-4 exhibited a significant drop in $M_w$ from 185,000 to 76,000 when run unsupported (P3-2) and supported (P2-2) while the late transition metal catalyst system TM-2/TM-3 exhibited the essentially insignificant drop from 353,000 to 325,000 (P3-1 vs. P2-1) when run under similar conditions. It is likely that the conjugated groups on the bridge TM-4 are affected in some manner by being supported on the solid particle such that the $M_w$ is decreased. Thus, selection for molecular weight tailoring can be guided by this observation, lower molecular weights can be achieved with those late transition metal catalyst system compounds having the conjugated groups on the bridge (e.g., A-11 through A-14 above) when a catalyst of this class is supported and utilized in slurry or gas phase processes. In support of the comparison of the dibromide vs. dimethyl starting complex, Brookhart, in JAC '95 p. 6414 Table entries 5 & 6, shows equivalent behavior for cationic methyl complexes and the dibromide complexes plus MAO. This is similarly supported by comparative examples $C_4$–$C_7$ of this application.

Supporting the catalysts in accordance with the invention also appears to cause a decrease in branching (branches/1000 carbon atoms). Thus the use of TM-4 in example P3-2 exhibited 89.0 branches/1000 carbon atoms while the use of the same catalyst supported in example P2-2 exhibited 80.1 branches/1000 carbon atoms, a decrease of about 10%. Similarly, the use of TM-3 in example P3-1 exhibited 88.6 branches/1000 carbon atoms while the use of the dibromide derivative TM-2 in example P2-1 exhibited 74.7 branches/1000 carbon atoms, a decrease of about 15%. Since branching is directly related to density and to melting point (MP) the differences will provide significant advantages for particle form processes such as gas phase and slurry polymerization processes.

The use of the supported catalyst systems of the invention also allow for increases in both $M_w$ and activity as compared to that to be expected from the teachings in the prior art with respect to use in solution polymerization of the late transition metal catalyst systems in unsupported form. Example P2-3 can be compared to P2-4 for exemplification of the increased $M_w$ from increased pressure when the catalysts are supported, the $M_w$ was 1.086×10$^6$ at 300 psia (2068 kPa) and 6.08×10$^5$ at 75.0 psia (517 kPa). The examples of Brookhart, et al, (Table V, C-1 vs. C-2) illustrate that one skilled in the art would expect little change in MW from increasing pressure, the $M_w$ was 1.6×10$^6$ at 14.7 psia (101 kPa) and 1.4×10$^6$ at 58.8 psia (405 kPa). Additionally, the polymer product yields of Brookhart, et al, supra, were essentially unchanged by the exhibited pressure change (2.1 g and 2.2 g, both after 30 min.). The supported catalyst of examples P2-3 and P2-4 showed that at higher pressure, only 20% less polymer was produced despite being run only one third of the time.

We claim:

1. A transition metal catalyst system for olefin polymerization comprising:
   I) a transition metal compound represented by the formula:
   $LMX_r$ wherein:
   (a) M is a Group 9, 10 or 11 metal;
   (b) L is a bidentate ligand defined by the formula:

$$\left[ R_m - E \overset{A}{\diagup \diagdown} E - R_n \right]^p \quad \text{wherein}$$

(vi) A is a bridging group containing a Group 13–15 element;
   (vii) each E is independently a Group 15 or 16 element covalently bonded to M;
   (viii) each R is independently a $C_1$–$C_{30}$ radical or diradical group which is a hydrocarbyl, substituted hydrocarbyl, halocarbyl, substituted halocarbyl, hydrocarbyl-substituted organometalloid, or halocarbyl-substituted organometalloid;
   (ix) m and n are independently 1 or 2; and
   (x) p is the charge on the bidentate ligand such that the overall charge of $LMX_r$ is neutral;
   (c) each X is, independently, a hydride radical, a hydrocarbyl radical, a substituted hydrocarbyl radical, a halocarbyl radical, a substituted halocarbyl radical, hydrocarbyl-substituted organometalloid or halocarbyl-substituted organometalloid; a neutral hydrocarbyl-containing donor ligand; a univalent anionic ligand; a neutral non-hydrocarbyl atom containing donor ligand; or two Xs are joined and bound to the metal atom to form a metallacycle ring containing from about 2 to about 20 carbon atoms; or two Xs are joined to form an anionic chelating ligand; and
   (d) r is 1, 2 or 3;
   II) an activator; and
   III) a solid support wherein said transition metal compound is immobilized on said support, where the transition metal loading is less than 100 micromoles transition metal per gram of solid support.

2. The catalyst system of claim 1 wherein said activator comprises an alkylalumoxane, a modified alkylalumoxane, an aluminum alkyl, an aluminum alkyl halide, an aluminum halide, an ionizing anion precursor compound and/or a noncoordinating anion precursor.

3. The catalyst system of claim 1 where the transition metal loading is from 10 to 80 micromoles transition metal per gram of solid support.

4. The catalyst system of claim 1 where the transition metal loading is from 20 to 80 micromoles transition metal per gram of solid support.

5. The catalyst system of claim 1 where the transition metal loading is from 40 to 60 micromoles transition metal per gram of solid support.

6. The catalyst system of claim 2 wherein $LMX_r$ has a square planar geometry.

7. The catalyst system of claim 2 wherein the solid support comprises silica.

8. The catalyst system of claim 2 wherein M is a first row transition metal.

9. The catalyst system of claim 2 wherein A comprises at least one conjugated group.

10. The catalyst system of claim 2 wherein the activator comprises an alumoxane and the transition metal compound-to-alumoxane molar ratio is from 1:500 to 10:1.

11. The catalyst system of claim 1 wherein M is Ni.

12. The catalyst system of claim 1, wherein the activator comprises methylalumoxane and/or modified methylalumoxane.

13. The catalyst system of claim 1, wherein the activator comprises a non-coordinating anion precursor and the total transition metal compound to noncoordinating anion precursor mole ratio is from 10:1 to 1:10.

14. The catalyst system of claim 1 wherein the activator comprises a non-coordinating anion.

15. The catalyst system of claim 14 wherein M comprises one or more of Ni, Pd, Pt, Cu, or Co.

16. The catalyst system of claim 15 wherein the transition metal compound-to-noncoordinating-anion molar ratio is from 10:1 to 1:10.

17. The catalyst system of claim 14 wherein A has at least one conjugated group.

18. The catalyst system of claim 14 wherein the transition metal is present on the support at less than 80 micromoles transition metal per gram of solid support.

19. The catalyst system of claim 14 wherein M is nickel.

20. The catalyst system of claim 14 wherein A is defined by the following formulae:

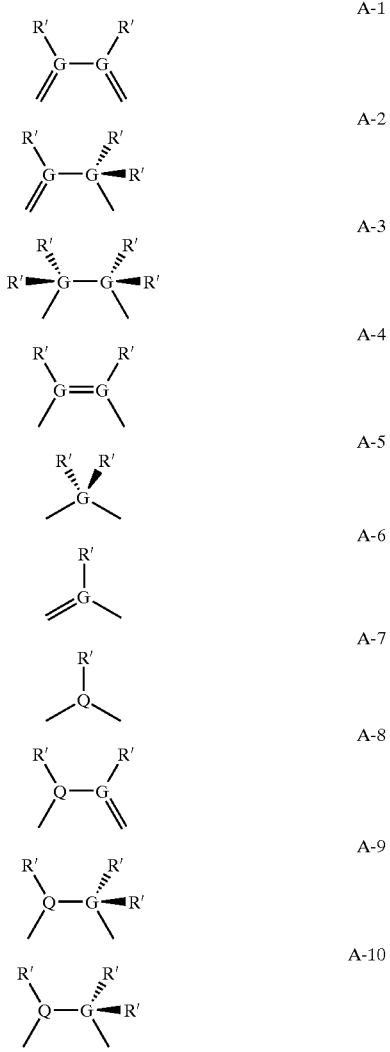

-continued

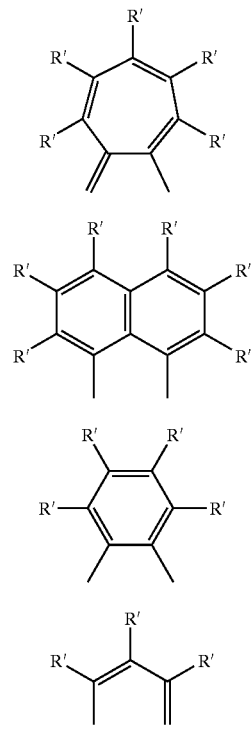

A-11

A-12

A-13

A-14

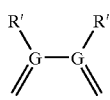

wherein G is a Group 14 element; Q is a Group 13 element; and R' are independently hydride radicals, $C_1$–$C_{30}$ hydrocarbyl radicals, substituted hydrocarbyl radicals, halocarbyl radicals, substituted halocarbyl radicals, or hydrocarbyl- or halocarbyl-substituted organometalloid radicals, and optionally two or more adjacent R' form one or more $C_4$ to $C_{40}$ rings to give a saturated or unsaturated cyclic or polycyclic ring.

21. The catalyst system of claim 14 wherein M is nickel, E is nitrogen, m is 1, n is 1, p is 0, A is defined by the formula:

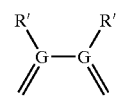

where each G is, independently, C, Si, or Ge, and each R' is a substituted phenyl group.

22. The catalyst system of claim 1 wherein the activator comprises an alumoxane.

23. The catalyst system of claim 22 wherein M is one or more of Ni, Pd, Pt, Cu or Co.

24. The catalyst system of claim 22 wherein the alumoxane comprises a modified alumoxane.

25. The catalyst system of claim 22 wherein the support comprises silica.

26. The catalyst system of claim 22 wherein the alumoxane comprises methylalumoxane.

27. The catalyst system of claim 22 wherein the alumoxane comprises modified methylalumoxane.

28. The catalyst system of claim 22 wherein the alumoxane comprises an alkyl alumoxane.

29. The catalyst system of claim 22 wherein A has at least one conjugated group.

30. The catalyst system of claim 23 wherein the transition metal compound-to-alumoxane molar ratio is from 1:500 to 10:1.

31. The catalyst system of claim 22 wherein M is nickel.

32. The catalyst system of claim 22 wherein A is defined by the following formulae:

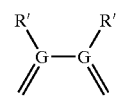

A-1

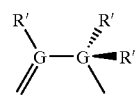

A-2

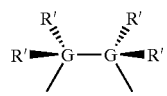

A-3

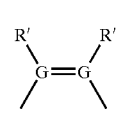

A-4

A-5

A-6

A-7

A-8

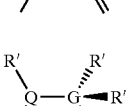

A-9

A-10

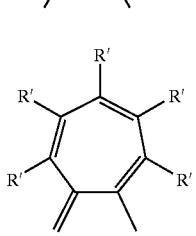

A-11

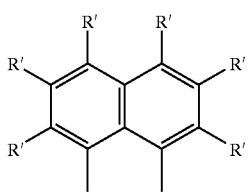

A-12

-continued

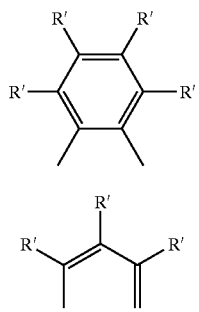

A-13

A-14 wherein G is a Group 14 element; Q is a Group 13 element; and R' are independently hydride radicals, $C_1$–$C_{30}$ hydrocarbyl radicals, substituted hydrocarbyl radicals, halocarbyl radicals, substituted halocarbyl radicals, or hydrocarbyl- or halocarbyl-substituted organometalloid radicals, and optionally two or more adjacent R' form one or more $C_4$ to $C_{40}$ rings to give a saturated or unsaturated cyclic or polycyclic ring.

33. The catalyst system of claim 22 wherein M is nickel, E is nitrogen, m is 1, n is 1, p is 0, A is defined by the formula:

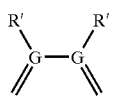

where each G is, independently, C, Si, or Ge, and each R' is a substituted phenyl group.

34. The catalyst system of claim 1 wherein the system is essentially without residual solvent.

35. The catalyst system of claim 34 wherein the activator comprises a non-coordinating anion.

36. The catalyst system of claim 34 wherein the activator comprises an alumoxane.

37. The catalyst system of claim 34 wherein the support comprises silica.

38. The catalyst system of claim 34 wherein A has at least one conjugated group.

39. The catalyst system of claim 36 wherein the transition metal compound-to-alumoxane molar ratio is from 1:500 to 10:1.

40. The catalyst system of claim 34 wherein M is nickel.

41. The catalyst system of claim 34 wherein A is defined by the following formulae:

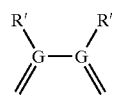

A-1

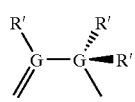

A-2

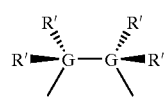

A-3

-continued

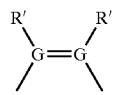

A-4

A-5

A-6

A-7

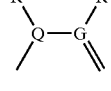

A-8

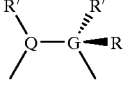

A-9

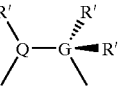

A-10

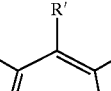

A-11

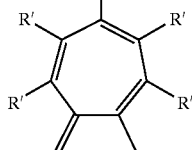

A-12

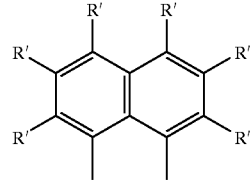

A-13

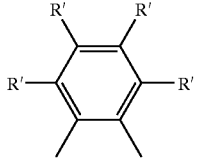

A-14 wherein G is a Group 14 element; Q is a Group 13 element; and R' are independently hydride radicals, $C_1$–$C_{30}$ hydrocarbyl radicals, substituted hydrocarbyl radicals, halocarbyl radicals, substituted halocarbyl radicals, or hydrocarbyl- or halocarbyl-substituted organometalloid radicals, and optionally two or more adjacent R' form one or more $C_4$ to $C_{40}$ rings to give a saturated or unsaturated cyclic or polycyclic ring.

42. The catalyst system of claim 34 wherein M is nickel, E is nitrogen, m is 1, n is 1, p is 0, A is defined by the formula:

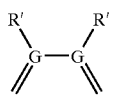

where each G is, independently, C, Si, or Ge, and each R' is a substituted phenyl group.

43. A catalyst system comprising the combination of the catalyst compound of claim 1 and tetrakis(perfluorophenyl) boron anion as the activator.

44. The catalyst system of claim 1 wherein the activator comprises a Group 13, 14, or 16 halide salt.

45. The catalyst system of claim 1 wherein the activator comprises a group 15 oxyfluoride salt.

46. The catalyst system of claim 1 wherein the activator comprises $BF_4^-$, $PF_6^-$, $TeOF_6^-$ and/or $AsF_6^-$.

47. The catalyst system of claim 1 wherein the support comprises a non-coordinating anion chemically bound to the support.

48. The catalyst system of claim 1 wherein the support comprises a polymeric support.

49. The catalyst system of claim 1 wherein the support comprises one or more Group 2, 3, 4, 5, 13, or 14 metal or metalloid oxides.

50. The catalyst system of claim 1 wherein the support comprises one or more of magnesia, titania, or zirconia.

51. The catalyst system of claim 1 wherein the support has a pore size of from 10 to 1000 Å.

52. The catalyst system of claim 1 wherein the support has a surface area of 10–700 m$^2$/g.

53. The catalyst system of claim 1 wherein the support has a pore volume of 0.1 to 4 cc/g.

54. The catalyst system of claim 1 wherein the support has an average particle size of 10–500 μm.

55. The catalyst system of claim 1 wherein the support has:

a) a surface area of 50 to 500 m$^2$/g;

b) a pore volume of 0.5 to 3.5 cc/g;

c) an average particle size of 20 to 200 μm; and d) a pore size of 50 to 500 Å.

56. The catalyst system of claim 55 wherein the transition metal compound is present on the support at a loading of 10–100 micromoles transition metal per gram of support.

57. The catalyst system of claim 56 wherein the loading is 20 to 80 micromoles transition metal per gram of support.

58. The catalyst system of claim 56 wherein the loading is 40 to 60 micromoles transition metal per gram of support.

* * * * *